United States Patent [19]

Close

[11] 4,056,899
[45] Nov. 8, 1977

[54] LIQUID-RECYCLING PLANTER

[76] Inventor: Dolores R. Close, 16003 Ludlow, Granada Hills, Calif. 91344

[21] Appl. No.: 725,978

[22] Filed: Sept. 23, 1976

[51] Int. Cl.$^2$ ............................................. A01G 27/00
[52] U.S. Cl. ........................................................ 47/79
[58] Field of Search ...................... 47/59–65, 47/48.5, 79–81, 1; 239/310, 318

[56] References Cited

U.S. PATENT DOCUMENTS

| | | | |
|---|---|---|---|
| 1,231,975 | 7/1917 | Weitzel | 47/79 |
| 1,810,236 | 6/1931 | Bender | 47/79 |
| 2,188,875 | 1/1940 | Ellis | 47/62 |
| 2,278,991 | 4/1942 | Hasslacher et al. | 47/79 |
| 2,306,027 | 12/1942 | Swaney | 47/79 |
| 2,648,164 | 8/1953 | Bruch | 47/79 |
| 2,870,574 | 1/1959 | Sheridan | 47/62 |
| 2,909,328 | 10/1959 | Babyak | 47/48.5 |
| 2,983,076 | 5/1961 | Merrill | 47/62 |
| 3,958,366 | 5/1976 | Meyers | 47/81 |

OTHER PUBLICATIONS

Kramer; J., 1974, "How to Plant Hanging Planters" *The Indoor Gardener's How-To-Build-It Book*, p. 68, Simon and Schluster, New York.

*Primary Examiner*—Clifford D. Crowder
*Assistant Examiner*—James R. Feyrer

[57] ABSTRACT

A planter with self-contained irrigation system includes a potting portion for receiving soil and a plant to be grown and a reservoir portion which acts as a base for the potting portion and which also carries the liquid to be used in irrigating the plant and the means for pumping the liquid to the potting portion, the potting portion having a liquid-return valve for returning to the reservoir portion any liquid not dissipated in the potting portion.

5 Claims, 3 Drawing Figures

U.S. Patent   Nov. 8, 1977   4,056,899
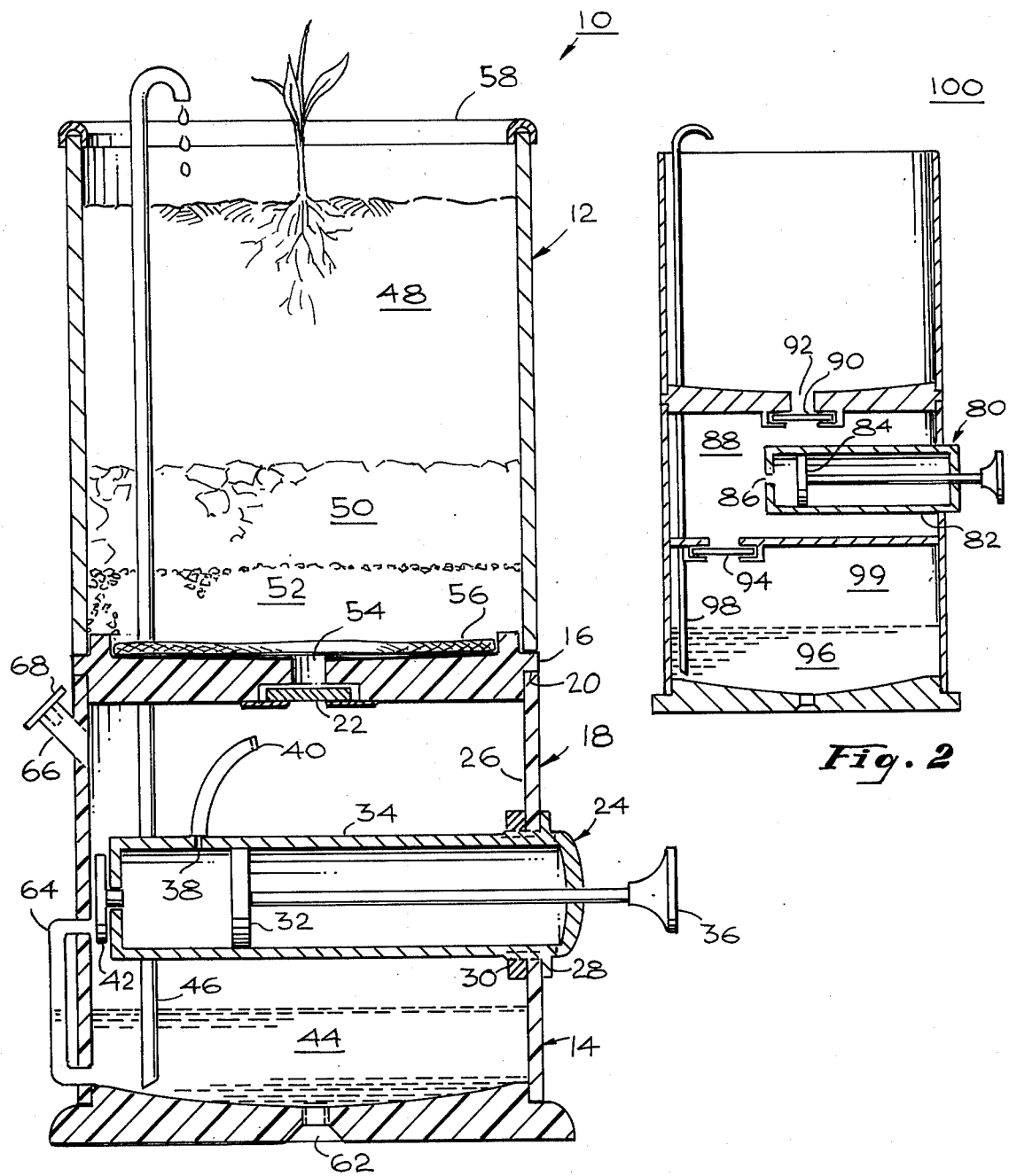
Fig. 1
Fig. 2
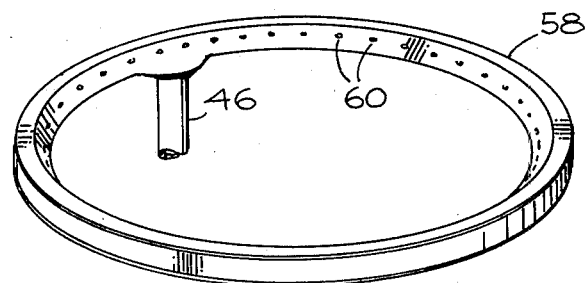
Fig. 3

LIQUID-RECYCLING PLANTER

BACKGROUND OF THE INVENTION

1. Field of the Invention

This invention relates to the field of irrigation systems for plant life and more specifically to planters with self-contained, recycling, irrigation systems.

2. Description of the Prior Art

A search of the patent art has shown the existence of the following U.S. Patents related to the subject matter of this invention:

U.S. Pat. No. 2,909,002
U.S. Pat. No. 3,749,319
U.S. Pat. No. 3,890,740
U.S. Pat. No. 3,669,357
U.S. Pat. No. 3,958,028

These patents relate to the broad field of irrigation systems for plant life and, in one case, to a liquid-recycling system, but they are applicable to large scale irrigation such as would be used on a ranch of in a grove and they do not provide to the small-scale plant grower, specifically the individual with a few indoor-growing plants, means for simply and neatly "watering" his plants with a liquid and for recycling the liquid, which may contain relatively expensive nutrient. All that is available is the familiar sprinkler can which must be filled before each use and wastes liquid not actually required by the plant.

Therefore, it is an object of this invention to provide a planter which overcomes the general disadvantages set forth hereinbefore.

It is a further object of this invention to provide an improved planter which conserves and recycles any unused irrigating liquid applied to the plant life contained in the planter.

SUMMARY OF THE INVENTION

Stated succinctly, a planter according to this invention includes a base-reservoir portion on which a potting section is supported. The potting section contains the soil, filter material, the plant life and, if required, an enclosing wall. The base-reservoir portion has a cover which carries therein a liquid-exit valve which, when the potting portion is in position on the base-reservoir portion, permits liquid not dissipated in the potting section to return to the reservoir. The base-reservoir portion includes a pump which may be operated manually or by a timed electrical motor which is coupled by a crank-shaft or otherwise to the piston actuating means if the pump is a reciprocating one. A centrifugal pump driven by the electrical motor may also be used. When the pump is operated, liquid from the reservoir is forced through a delivery tube to the upper surface of the soil in the potting portion of the planter. That liquid (insofar as it is unused or does not evaporate) then trickles through the soil (and through purifying filter, if desired) back to the base reservoir for recycling. The process of plant watering thus becomes simple, neat and minimally expensive.

BRIEF DESCRIPTION OF THE DRAWINGS

A better understanding of my invention may be had from a consideration of the following detailed description, taken in connection with the accompanying drawings, in which:

FIG. 1 is a schematic diagram, partially in cross-section, showing a first embodiment of my invention;

FIG. 2 is a schematic diagram, partially in cross-section, of a second embodiment of my invention; and, FIG. 3 is a diagram showing a modification of a portion of the embodiment of FIG. 1.

DESCRIPTION OF THE PREFERRED EMBODIMENTS

In FIG. 1, planter 10 includes potting portion 12, base-reservoir portion 14 and pressure chamber 18. Pressure chamber 18 includes top cover 16 which may be formed separately from pressure chamber 18 but, when in place, top cover 16 forms a pneumatic seal with the upper edge 20 of pressure chamber 18. Top cover 16 forms a supporting base for potting portion 12. Top cover 16 includes return valve 22 which is normally open to permit undissipated liquid from potting portion 12 to return to reservoir portion 14.

Pump 24 is supported in wall 26 of pressure chamber 18 by means of, for example, peripheral stop 28 and nut 30. Gaskets, not shown, may be provided on both sides of wall 26 to assure pneumatic and hydraulic sealing of the junction between pump 24 and wall 26. Pump 24 has piston 32, cylinder 34 and actuator 36. Air inlet port 38 is coupled to an intake valve 40, which permits air to flow into cylinder 34 when piston 32 is withdrawn, but which does permit the exiting of air from cylinder 34 when piston 32 is moved in the compressing direction by handle 36. In a simplified form, leakage of air around piston 32 as it is withdrawn may be relied upon to refill cylinder 34, instead of relying on air brought in through valve 40. Pump valve 42 is normally closed but opens in response to the compressing of air in cylinder 34 as piston 32 moves towards valve 42. The compressed air closes valves 40 and 22 and puts pressure on the surface of liquid 44 in reservoir 14 causing such liquid to be forced through delivery tube 46, and other delivery tubes, if any, which are provided, with the result that the liquid from reservoir 44 is supplied to the upper surface of soil 48. That liquid, which may contain nutrient material, such as liquid fertilizer, is absorbed in soil 48 until it becomes saturated, either generally or locally, and after saturation it trickles through charcoal filter 50, which removes some of the bacteria and algae which would tend to accumulate in repeatedly re-used liquid, and through a gravel bed 52 to outlet 54 in top cover 16. There valve 22 controls the return of liquid to the stored liquid 44. Additional filters 56, of porous plastic, may be supplied to keep soil and other solid materials out of valve 22.

Potting section 10 may be removed and any standard flower pot used, in which case delivery tube 46 would be made flexible.

Cap 58 may be made in the form of a manifold, i.e. may be hollow and have multiple perforations. Delivery tube 46 may then be coupled into cap 58 as shown in FIG. 3 and, with such an arrangement, the actuation of pump 24 will cause liquid 44 to be supplied from points 60 around the inner circumference of cap 58 to the upper surface of soil 48.

A removable drain plug 62 may be provided in the bottom of reservoir 14.

Water level indicator 64 and fill-pipe 66 having pneumatic sealing plug 68 may also be provided in base-reservoir 14.

In FIG. 2, the system for producing pressure in the system is changed from that of FIG. 1.

Pump 80 has cylinder 82 and piston 84. Cylinder 82 has end opening 86.

Movement of piston 84 towards end opening 86 compresses the air in cylinder 82 which pressure increase is transmitted through opening 86 into pressure chamber 88 and causes valve 90 to close, thus preventing the escape of air through opening 92, and causes valve 94 to open, putting increased pressure on the surface of liquid 96 and causing it to exit through delivery tube 98. When piston 84 is withdrawn a partial vacuum is produced in upper or pressure chamber 88 causing valve 90 to open and bringing liquid and air into chamber 88 through opening 92. At the same time, valve 94 is caused to close and any liquid flowing through opening 92 is collected in upper chamber 88 until, once again, piston 84 moves inwardly, forcing valve 90 closed and valve 94 open. Any liquid which has collected in pressure chamber 88 then returns to lower chamber 99 which contains liquid 96. Other details of planter 100 are similar to those of planter 10.

While particular embodiments of my invention have been disclosed and claimed it should be understood that many variations may be made upon my invention without departing from the spirit thereof. It is the intention of the appended claims to cover all such variations as well as the embodiments disclosed herein.

I claim:

1. A liquid recycling planter including, in combination:

a reservoir portion, a potting portion and liquid delivery means coupled between said reservoir portion and said potting portion;

said reservoir portion including a liquid chamber having a bottom;

means for producing in said reservoir portion air pressure above atmospheric pressure;

said reservoir portion including, in addition, a pressure chamber to which said means for producing greater than atmospheric pressure is coupled, said pressure chamber being separated from said liquid chamber by a lower wall, said lower wall including a lower valve responsive to increased pressure in said pressure chamber to open, whereby air and liquid flow into said liquid chamber from said pressure chamber is permitted, said pressure chamber having a cover, said cover including an upper valve, said upper valve being responsive to pressure above atmospheric pressure in said pressure chamber to close said upper valve, whereby air cannot escape therethrough into said potting portion, said upper valve being responsive to less than atmospheric pressure in said pressure chamber to open, permitting air and liquid to flow from said potting portion into said pressure chamber;

said liquid delivery means being positioned for transporting liquid out of said liquid chamber to said potting portion in response to increased air pressure in said reservoir portion.

2. Apparatus according to claim 1 in which said means for producing greater than atmospheric pressure includes a hand pump.

3. Apparatus according to claim 1 in which said potting portion is supported from and above said reservoir portion and in which said delivery means includes an open-ended, hollow tube extending from said liquid chamber to the upper region of said potting portion.

4. Apparatus according to claim 1 in which said liquid delivery means includes a perforated hollow cap.

5. Apparatus according to claim 1 in which said potting portion includes, in addition, soil, charcoal filtering material and gravel, in that order, commencing at the upper surface of said potting portion and proceeding towards said cover.

* * * * *